(12) United States Patent
Fujiki et al.

(10) Patent No.: US 8,945,323 B2
(45) Date of Patent: Feb. 3, 2015

(54) METHOD OF BUILDING CARCASS BAND AND STITCHER APPARATUS

(75) Inventors: Osamu Fujiki, Osaka (JP); Tomoyuki Takatsuka, Osaka (JP); Yu Hatayama, Osaka (JP); Taizo Yamamoto, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 1007 days.

(21) Appl. No.: 12/160,508

(22) PCT Filed: Jan. 12, 2006

(86) PCT No.: PCT/JP2006/300293
§ 371 (c)(1),
(2), (4) Date: Apr. 2, 2009

(87) PCT Pub. No.: WO2007/080640
PCT Pub. Date: Jul. 19, 2007

(65) Prior Publication Data
US 2010/0043949 A1    Feb. 25, 2010

(51) Int. Cl.
*B29D 30/14*    (2006.01)
*B29D 30/28*    (2006.01)

(52) U.S. Cl.
CPC .................................... *B29D 30/28* (2013.01)
USPC ........ 156/130.3; 156/402; 156/408; 156/409; 156/410; 156/411; 156/412; 156/413; 156/421; 156/421.6; 156/421.8

(58) Field of Classification Search
CPC ..... B29D 30/14; B29D 30/28; B29D 30/2607
USPC ........... 156/130.3, 402, 408–413, 421, 421.6, 156/421.8
See application file for complete search history.

(56) References Cited

U.S. PATENT DOCUMENTS

| 4,039,366 A * | 8/1977 | Yabe | 156/406.2 |
| 2006/0048884 A1 * | 3/2006 | Kudo et al. | 156/130.3 |

FOREIGN PATENT DOCUMENTS

| JP | 51-49283 | 4/1976 |
| JP | 2-175234 A | 7/1990 |

(Continued)

OTHER PUBLICATIONS

International Search Report of PCT/JP2006/300293, date of mailing Feb. 14, 2006.

*Primary Examiner* — John Goff
*Assistant Examiner* — Carson Gross
(74) *Attorney, Agent, or Firm* — Westerman, Hattori, Daniels & Adrian, LLP

(57) ABSTRACT

The invention enables to pressure-bond a carcass ply sheet pasted onto a rubber laminating member wound around a periphery of a building drum firmly along a recessed and projected shape of the rubber laminating member without producing a deformation or a warp of a carcass cord, by using a stitcher apparatus constituted by arranging a plurality of pressure-bond rollers having axis centers in a tangential direction of a concentric circle having a diameter larger than that of a building drum in a peripheral direction by a plurality of rows and by a constant pitch by being respectively supported to be able to progressively displace to an inner side in a diameter direction, while moving the building drum in an axial direction relative to the pressure-bond rollers on an inner side of a circular arrangement of the pressure-bond rollers, a carcass ply sheet is pressed by a predetermined pressure to pressure-bond over an entire periphery and simultaneously by the respective pressure-bond rollers progressively displaced to the inner side in the diameter direction.

3 Claims, 8 Drawing Sheets

(56) References Cited

FOREIGN PATENT DOCUMENTS

| | | | | |
|---|---|---|---|---|
| JP | 3-83631 A | 4/1991 | | |
| JP | 06-286018 | * 10/1994 | ............. | B29D 30/30 |
| JP | 6-286018 A | 10/1994 | | |
| JP | 7-60868 A | 3/1995 | | |
| JP | 9-29858 A | 2/1997 | | |
| JP | 2000-202921 A | 7/2000 | | |
| JP | 2003-231187 A | 8/2003 | | |
| SU | 1326446 | * 7/1987 | ............. | B29D 30/14 |

* cited by examiner

METHOD OF BUILDING CARCASS BAND AND STITCHER APPARATUS

TECHNICAL FIELD

The present invention relates to a method of building a carcass band in tire building and a stitcher apparatus used for the building.

BACKGROUND ART

A tire is constituted by including a plurality of rubber laminating members and a plurality of reinforcement members constituting a main member by a cord. Repetitively, as shown by FIG. 12, a tire T is constituted by forming respective portions of an inner liner 1, a tread 2, a side wall 3, a rim strip or a chafer 4 and the like by rubber laminating members respectively in accordance with required properties and combining the rubber laminating members with a carcass layer 6, a belt layer 7, a bead 8 and the like constituting reinforcement members including cords.

In a background art, as a method of building a tire constructed by the above-described constitution, there is known a two stage building method of pasting an inner liner, a carcass ply sheet or the like onto an expandable/contractable building drum, further forming a bead and a side wall to constitute a green case, successively, transferring the green case to a secondary building drum for shaping, deforming the green case in a toroidal shape, and pasting a belt, a tread rubber or the like thereon to thereby build an unvulcanized green tire (for example, Patent References 1 and 2).

In recent years, since pasting and forming of a plurality of tire constituting members at the same building position prolongs a building cycle time period to constitute a hazard against promoting a productivity, it is proposed to use a building drum of a moving type to carry out building of pasting or the like of a tire constituting member while successively moving the building drum to predetermined forming positions in correspondence with the respective tire constituting members. Further, with regard to a rubber laminating member of an inner liner, tread rubber, side wall rubber or the like, as shown by Patent References 3 and 4, it is proposed to form a rubber member having a predetermined sectional shape by laminating an unvulcanized rubber strip extruded in a ribbon shape on a rotation support member of a building drum or the like to wind.

Further, with regard to the carcass layer, there is also a case in which at a stage for band building separately from a primary building machine of carrying out bead set, turn up or the like, after winding a rubber laminating member of an inner liner, a chafer or the like onto a building drum for band building, a carcass ply sheet constituting a carcass layer is pasted and laminated thereon to constitute a carcass band in a shape of a circular cylinder, the carcass band is transferred to a building drum of a primary building machine, and bead set and turn up or the like are carried out.

Meanwhile, in building tire, in order to ensure a quality of a product tire, it is a very important factor to adhere to laminate tire constituting members to be laminated firmly without producing an air gap (air storage) at inside thereof.

For example, although in a step of building a carcass band, a rubber laminating member of an inner liner, a chafer or the like constituting an inner side layer is wound on a periphery of a building drum, successively, one layer or a plurality of layers of carcass ply sheets are pasted on the rubber laminating member, thereafter, the carcass ply sheet is pressed from an outer periphery to be pressure-bonded to the rubber laminating member, at this occasion, pressure bonding needs to carry out firmly in order to ensure a quality of a product tire.

In a background art, in building the carcass band, as shown by FIG. 9 and FIG. 10, in pressure-bonding a carcass ply sheet pasted on the rubber laminating member on the periphery of the building drum, there is adopted a method of using a pressure-bond roller 125 having a flexibility of a length substantially in correspondence with a width in an axial direction of a building drum D, and pressing a carcass ply sheet 116 (to constitute the carcass layer 6 in FIG. 12) on a periphery of the building drum D on an outer periphery by the pressure-bond roller 125 by rotating the building drum D to thereby pressure-bond to the rubber laminating member 110 on an inner side over an entire periphery thereof.

However, an outer peripheral face of the rubber laminating member 110 of the inner liner or the like wound on the periphery of the building drum D constitutes a recessed and projected shape owing to, for example, a rubber strip, a chafer or the like wound partially therearound (FIG. 10). Therefore, according to the pressure-bond roller 125 prolonged in the axial direction, a longitudinal direction of the pressure-bond roller 125 and a direction of extending a partial projected portion 110a of the rubber laminating member 110 (peripheral direction) are intersected with each other. As a result thereof, there is a case in which a press force is concentrated on a vicinity of the projected portion 110a, the press force at a recessed portion 110b is reduced, and a pressure-bond force becomes deficient, at the same time, air at inside thereof is liable to stay at the recessed portion 110b at which the pressure-bond force is low, a bleeding effect is also insufficient, a uniform adhering state is not achieved, which effects an influence on the quality of the product tire.

Further, in the pressure-bonding method, when the press force of the pressure-bond roller 125 is intensified in order to increase the adhering force, as a result of operating an excessive degree of the press force to the carcass ply sheet 116 which has been wound uniformly in winding, as shown by FIG. 11, a slacken-up portion is produced at the carcass ply sheet 116, deformation or warp is produced at the sheet, and therefore, a carcass cord, a drawback is brought about in a uniformity of a tire constituting member and there is a concern of deteriorating the quality of the product tire.

Patent Reference 1: JP-A-7-60868
Patent Reference 2: JP-A-2003-231187
Patent Reference 3: JP-A-2000-202921
Patent Reference 4: JP-A-9-29858

DISCLOSURE OF THE INVENTION

Problems that the Invention is to Solve

The invention has been carried out in order to resolve the above-described problem and provides a method of building a carcass band capable of pressure-bonding a carcass ply sheet pasted on a rubber laminating member wound on a periphery of a building drum firmly along a recessed and projected shape of the rubber laminating member and substantially uniformly over an entire periphery without producing a deformation or a warp at a carcass cord, capable of achieving an excellent adhering state, and capable of excellently ensuring a quality of a product tire and a stitcher apparatus therefor.

Means for Solving the Problems

The invention is a method of building a carcass band in building a tire characterized in that when a carcass ply sheet is pressed from an outer periphery thereof to be pressure-bonded to a rubber laminating member after pasting the carcass ply sheet onto the rubber laminating member wound around a building drum, by using a stitcher apparatus constituted by arranging a plurality of pressure-bond rollers having axis centers in a tangential direction relative to a concentric circle having a diameter larger than a diameter of the building drum in a circular shape by a constant pitch in a plurality of rows in a peripheral direction by being respectively supported to be able to progressively displace to an inner side in a diameter direction, on an inner side of the circular arrangement of the pressure-bond roller, while moving the building drum in an axial direction relative to the pressure-bond rollers, the carcass ply sheet is pressed to be pressure-bonded simultaneously over an entire periphery thereof and by a predetermined pressure by the pressure-bond rollers progressively displaced to an inner side in a diameter direction.

In this way, while moving the building drum relative to the pressure-bond rollers arranged in the circular shape in the axial direction, the carcass ply sheet is pressure-bonded to the rubber laminating member by being pressed by the pressure-bond rollers over the entire periphery and simultaneously, and therefore, the carcass ply sheet can be pressure-bonded along a recessed and projected shape of the rubber laminating member on an inner side firmly and over an entire width and substantially uniformly, even when an excessively large press force is not exerted, air is firmly exhausted, a partial deficiency in pressure-bonding is not brought about, an excellent adhering state can be achieved. Further, excessively large press force may not be exerted to the pressure-bond rollers, and therefore, the carcass ply sheet is pressure-bonded over the entire periphery and simultaneously by moving the pressure-bond rollers in the axial direction, the carcass ply sheet can be pressure-bonded without producing a deformation of a slacken-up or the like and also a deformation or a warp of the carcass cord can be restrained from being brought about.

In the method of building the carcass band, it is possible that the carcass ply sheet is pressed by the pressure-bond rollers to pressure-bond from a center portion in a width direction over to two left and right side ends by moving the building drum relative to the pressure-bond rollers of the stitcher apparatus from a vicinity of a center portion to left and right sides in the axial direction. In this case, tensions in a width direction produced at the carcass ply sheet by moving the building drum and the pressure-bond roller relative top each other in the axial direction are operated respectively in directions opposed to each other at left and right portions, and therefore, the carcass ply sheet can be pressure-bonded without hardly producing a deformation or a warp at the carcass ply sheet, that is, the carcass cord.

Further, it is also possible that the carcass ply sheet is pressed by the pressure-bond rollers to pressure-bond from one side end portion to other side end portion in a width direction to move the building drum relative to the pressure-bond rollers of the stitcher apparatus from one side end to other side end in the axial direction. Also in this case, the carcass ply sheet is pressure-bonded from one side end portion to other side end portion in the width direction of the carcass ply sheet over an entire periphery and simultaneously by the pressure-bond rollers, and therefore, the carcass ply sheet can be pressure-bonded without producing a deformation or a warp at the carcass ply sheet, that is, the carcass cord.

In the method of building the carcass band, it is possible that the carcass ply sheet is pressure-bonded by moving an inner side of the pressure-bond roller of the stitcher apparatus by moving a moving support base by supporting the building drum in a cantilever state by the moving support base movable on a track at one end portion of a shaft portion thereof. Thereby, the carcass ply sheet pasted to the building drum as described above can be pressure-bonded without problem while moving the carcass ply sheet by the pressure-bond rollers arranged in the circular shape over the entire periphery, simultaneously while moving in the axial direction.

It is possible that the stitcher apparatus is installed at a region of moving the building drum by the moving support base contiguous to a building position of winding the carcass ply sheet, the building drum is moved to a portion of the stitcher apparatus after having been pasted with the carcass ply sheet to move relative to the pressure-bond roller in the axial direction. Thereby, when the corresponding building positions are set for the respective members constituting the carcass band and the carcass band is built while successively moving the building drum to the respective building positions, the pressure-bonding after pasting the carcass ply sheet can efficiently be carried out.

Other of the invention is characterized in a stitcher apparatus carcass for pressing a carcass ply sheet from an outer periphery thereof to be pressure-bonded to a rubber laminating member after pasting the carcass ply sheet onto the rubber laminating member wound around a building drum, the stitcher apparatus including a ring-like frame capable of passing the building drum, wherein an inner periphery of the ring-like frame is arranged with a plurality of pressure-bond rollers having axis centers in a tangential direction relative to a concentric circle having a diameter larger than a diameter of the building drum in a circular shape of a constant pitch by a plurality of rows thereof in a peripheral direction respectively supported to be able to progressively displace to an inner side in the diameter direction by extracting and retracting means and arranged by shifting positions thereof in the peripheral direction so as not to be spaced apart from each other by intervals therebetween as a whole at least when the pressure-bond rollers of respective rows are brought into a state of being progressively displaced to an inner side in the diameter direction, and wherein the pressure-bond rollers are provided to be able to press the carcass ply sheet to pressure-bond over an entire periphery, simultaneously and by a predetermined pressure by the respective pressure-bond rollers progressively displaced to the inner side in the diameter direction by moving the building drum in the axial direction relative to the pressure-bond rollers from an inner side in the circular arrangement of the pressure-bond rollers.

According to the stitcher apparatus, by relatively moving the building drum pasted with the carcass ply sheet in the axial direction on the inner side of the pressure-bond rollers arranged in the circular shape, the carcass ply sheet can be pressed to pressure-bond by the respective pressure-bond rollers over the entire periphery of the carcass ply sheet, simultaneously in one motion, thereby, the method of building the carcass band of the invention can excellently be carried out.

In the stitcher apparatus, it is preferable that the pressure-bond rollers are arranged in a circular shape by two rows in a peripheral direction, and arranged by shifting positions thereof such that an interval between the respective pressure-bond rolls of two rows is smaller than a roller width at least in a state of being progressively displaced to the inner side in the diameter direction and portions of the respective pressure-bond rolls of the two rows overlap each other in the axial direction. Particularly, it is preferable that the pressure-bond rollers of the two rows are arranged by shifting the positions by half pitches to constitute zigzag positions.

Thereby, by relatively moving the building drum and the pressure-bond rollers arranged in the circular shape in the axial direction, the carcass ply sheet can be pressure-bonded in one motion without being spaced apart from each other by the intervals in the peripheral direction by the pressure-bond rollers and can be pressure-bonded over the entire periphery, efficiently and substantially uniformly.

It is preferable that the extracting and retracting means for supporting the respective pressure-bond rollers are cylinder apparatus provided to the ring-like frame to be directed to the inner side and by operating the cylinder apparatus, the respective pressure-bond rollers are displaced progressively to the inner side in the diameter direction by one motion to be able to pressure-bond the carcass ply sheet by a constant press force. Thereby, the carcass ply sheet can be pressure-bonded by maintaining the press force constant, and therefore, even when the rubber laminating member on the inner side constitutes the recessed and projected shape, a total of the carcass ply sheet can be pressure-bonded to the rubber laminating member without excess or deficiency without producing a partial difference in the pressure-bond force and excellent and uniform adhering state can be achieved.

Further, it is preferable that in the respective pressure-bond rollers, roll members having an elasticity are axially supported rotatably by front end portions of the extracting and retracting means, because the carcass ply sheet can be pressure-bonded elastically by a substantially uniform press force.

Advantage of the Invention

According to the method of building the carcass band of the invention and the stitcher apparatus using the same, by moving the building drum relative to the pressure-bond rollers of the stitcher apparatus in the axial direction, the carcass ply sheet pasted onto the rubber laminating member on the periphery of the building drum can be pressure-bonded to the rubber laminating member firmly along the recessed and projected shape, and over an entire periphery, substantially uniformly without excess or deficiency, dwell of air is not brought about even in the recessed portion and the uniform adhering state can be achieved. Further, it is not necessary to carry out the pressure-bonding by excessively large press force, and therefore, the carcass cord can be pressure-bonded to the rubber laminating member without producing a deformation of a warp, and therefore, a quality of a product tire can excellently be ensured.

BEST MODE FOR CARRYING OUT THE INVENTION

An embodiment of the invention will be explained as follows based on an example shown in the drawings.

FIG. 1 shows an outline of a portion of a step including a stitcher apparatus according to the invention in a band building step for building a carcass band in a shape of a circular cylinder in tire building.

FIG. 2 is a front view of the stitcher apparatus of the example of the invention, and FIG. 3 is a sectional view enlarging a portion of the stitcher apparatus.

FIG. 4 is a front view of a portion of the stitcher apparatus showing an arrangement of a pressure-bond roller thereof, and FIG. 5 and FIG. 6 are development views showing outlines of portions for explaining arrangements of a non progressive displacement state and a progressive displacement state of the pressure-bond roller.

FIG. 7 is an explanatory view in a pressure-bond operational procedure by the pressure-bond roller and FIG. 8 is an explanatory view of a pressure-bond operational state by the pressure-bond roller.

In FIG. 1, notation D designates a building drum for building a band, which has a peripheral face of a width larger than a width of a carcass band constituting an object of building, and is constituted expandably and contractably by a plurality of pieces for constituting a peripheral face. Notation 11 designates a moving support base for supporting the building drum D in a cantilever state and moving the building drum D to be able to drive to rotate at one end portion of a shaft portion d1 thereof, and notation 12 designates a drum drive portion constituting a support portion. Notation 13 designates a track for moving the moving support base 11 and building positions of respective members constituting the carcass band are set to positions different from each other along the track 13. In a case of FIG. 1, servicer S1 and S2 of one layer or a plurality of layers of carcass ply sheets 16, for example, two layers including first and second carcass ply sheets 16a and 16b, and an extruder E of a rubber strip for forming an inter-ply tape are installed at the respective building positions. Notation 14 designates a base portion for the track.

At a portion of other moving region (not illustrated) of the moving support base 11 continuous to the track 13, a rubber laminating member 10 such as an inner liner, a chafer, a squeegee or the like is laminated to form on a periphery of the building drum D by winding a rubber strip in a ribbon-like shape extruded by, for example, an extruder, thereafter, moved to predetermined building positions opposed to the servicers S1 and S2 and the extruder E, and the carcass ply sheets 16 and the inter-ply tape (not illustrated) are laminated to paste on the rubber laminating member 10. Normally, after pasting to laminate the first carcass ply sheet 16a by the first servicer S1, the inter-ply tape is pasted to laminate, thereafter, the second carcass ply sheet 16b is pasted to laminate. Further, the rubber laminating member 10 of the inner liner, the chafer, the squeegee or the like is not limited to be laminated by winding the rubber strip but there is also a case in which a rubber laminating member having a wide width molded in a predetermined sectional shape similar to the background art is pasted to laminate.

After pasting to laminate the carcass ply sheet 16, the building drum D is moved to a portion of a stitcher apparatus 20 for pressing the carcass ply sheet 16 to pressure-bond from an outer periphery thereof over an entire periphery by moving the moving support base 11.

The stitcher apparatus 20 is installed to be opposed to a non support side portion of the building drum D that is supported, in a manner of cantilever at a position of an end portion of the moving region of the building drum D, by the moving support base 11 contiguous to the building positions of pasting the carcass ply sheets 16 (16a, 16b) to the building drum D; and the stitcher apparatus 20 is provided such that only a portion of the building drum D passes through a portion of the stitcher apparatus 20 in an axial direction. The stitcher apparatus 20 is constituted as follows.

The stitcher apparatus 20 includes a ring-like frame 21 opposed to the moving portion of the building drum D supported by the moving support base 11 in the cantilever style constituting a shape of a circle having a diameter larger than that of the building drum D at an inner periphery thereof, and capable of passing the building drum D with an allowance. The ring-like frame 21 is installed, for example, on the base portion 14 for the track. The inner periphery of the ring-like frame 21 is arranged with a number of pressure-bond rollers 25 having axis centers in a tangential direction on a concentric circle having a diameter more or less larger than that of the building drum D to be supported to be able to progressively displace respectively to an inner side in a diameter direction by extracting and retracting means of a cylinder apparatus or the like mentioned later in a plurality of rows in a peripheral direction and in a circular shape by a constant pitch P. At least in a state of being progressively displaced to the inner side in the diameter direction, the pressure-bond rollers 25, 25 of the respective rows are arranged by shifting positions thereof in the peripheral direction so as not to be spaced apart by intervals in the peripheral direction as a whole and provided such that at least portions of the pressure-bond rollers 25 of contiguous rows overlap each other in the axial direction. Thereby, the carcass ply sheet 16 on the building drum D passing the inner side in a circular arrangement of the pressure-bond rollers 25 is made to be able to be pressed over the entire periphery by the pressure-bond rollers 25 of the respective rows simultaneously without being spaced apart by the intervals.

In the case of the drawing, the pressure-bond rollers 25 are arranged in two rows in the peripheral direction and arranged by the predetermined pitch P by shifting positions thereof by half pitches such that the two rows of pressure-bond rollers 25, 25 are disposed at zigzag positions by making an interval S between rollers in the peripheral direction of the two rows becomes smaller than the roller width W at least in a state of being progressively displaced to the inner side in the diameter direction (indicated in FIG. 4 by chain lines).

That is, although as shown by FIG. 5, when the respective pressure-bond rollers 25, 25 of the two rows in the peripheral direction are brought into the nonprogressive state (non press operation state) by the extracting and retracting means, the respective pressure-bond rollers are arranged by the pitch P in the zigzag positions by the interval S between the rollers in the peripheral direction larger than the roller width W, when brought into a state of being displaced progressively to the inner side in the diameter direction (press operation state), as substantially shown by FIG. 6, the respective pressure-bond rollers 25, 25 are arranged in the zigzag positions in a state of overlapping each other in the axial direction by making the interval S smaller than the roller width W. Further, the example can be embodied even when the two rows of the pressure-bond rollers 25, 25 are not arranged necessarily by shifting the positions by the half pitch so far as portions thereof are brought into a state of overlapping each other in zigzag in the axial direction.

Further, with regards to the extracting and retracting means for supporting the pressure-bond rollers 25, 25, as enlarged to show in FIG. 3 and FIG. 4, a number of cylinder apparatus 23 as the extracting and retracting means are aligned to the inner side in the diameter direction at intervals in correspondence with the pitch P of arranging the pressure-bond rollers 25 by two rows in the peripheral direction at inside of the ring-like frame 21, the pressure-bond rollers 25 are axially supported by brackets 24 provided at front end portions of output shafts 23a of the cylinder apparatus 23 centering on axis centers in a tangential line direction of a circle concentric with the inner peripheral circle of the ring-like frame 21, thereby, the two rows of respective pressure-bond rollers 25 are arranged in a circular shape, and supported to carry out the press operation by being progressively displaced to the inner side in the diameter direction by respectively operating the cylinder apparatus 23. Therefore, the respective cylinder apparatus 23 supporting the respective pressure-bond rolls 25 are set to be able to press the carcass ply sheet 16 pasted to laminate on the building drum D in accordance with the diameter of the carcass band constituting the object of building and controlled to maintain a constant press force in the press operation.

That is, the respective cylinder apparatus 23 are set such that when the cylinder apparatus 23 are not operated, the respective pressure-bond rollers 25 in the circular arrangement are brought into the non progressive displacement state, an inscribed circle diameter thereof is more or less larger than an outer diameter of the carcass ply sheet 16 pasted to laminate on the building drum D, and when the cylinder apparatus 23 are operated, by progressively displacing the respective pressure-bond rollers 25 to the inner side in the diameter direction, the inscribed circle diameter is contracted more than the outer diameter of the carcass ply sheet 16 on the building drum D to be able to press-bond the carcass ply sheet 16 by the predetermined press force.

The operation of the cylinder apparatus 23 is controlled to carry out a predetermined press operation relatedly to movement of the building drum D relative to the stitcher apparatus 20 and is controlled to maintain the constant press force by being displaced in the progressing and regressing direction in correspondence with a recessed and projected shape of the surface of the ply sheet constituting a press face. Further, an inner diameter of the ring-like frame 21, the inscribed circle diameter of the circular arrangement of the pressure-bond rollers 25 and the like are pertinently set in accordance with the carcass band constituting the object of building, that is, a size of a tire to be fabricated.

Further, although the example can also be embodied by supporting the pressure-bond roller 25 to be able to progressively displace to the inner side in the diameter direction by utilizing spring means or the like, in view of firmness or easiness of the press operation, and uniformity of the press force, it is preferable to control the press force by using cylinder apparatus as described above, and is further preferable particularly to utilize an air cylinder capable of permitting the displacement in the extracting and retracting direction in correspondence with a recessed and projected shape of a press face. Further, the example can also be embodied by providing the pressure-bond roller 25 displaceably by way of spring means at the front end portion of the output shaft 23a of the cylinder apparatus 23 to press to operate elastically.

The carcass ply sheet 16 pasted to the rubber laminating member 10 on the periphery of the building drum D is pressure-bonded by the stitcher apparatus 20 of the embodiment mentioned above as follows.

After winding to laminate the rubber laminating member 10 of an inner liner, a chafer, a squeegee or the like on the outer peripheral face of the building drum D supported by the moving support base 11 in the cantilever style, the building drum D is moved to the building positions of the first and the second carcass ply sheet 16a and 16b, and the carcass ply sheets 16a and 16b are pasted to laminate above the rubber laminating member 10 by way of the inter-ply tape. Thereafter, the building drum D is moved to the portion of the stitcher apparatus 20, and made to progress in the axial direction to an inner side of the circular arrangement of the pressure-bond roller 25 from a nonsupporting side (FIG. 7).

At this occasion, the inscribed circle diameter of the pressure-bond rollers 25 in the circular arrangement is made to be smaller than the outer diameter of the carcass ply sheet 16 on the building drum D by progressively displacing the plurality of rows of respective pressure-bond rollers 25 arranged in the circular shape along the inner periphery of the ring-like frame 21 while controlling the respective pressure-bond rollers 25 to maintain the predetermined pressure by operating the cylinder apparatus 23 constituting the expanding and contracting means. Thereby, by making the building drum D progress to inside of the pressure-bond rollers 25 in the circular arrangement from the nonsupporting side, the carcass ply sheet 16 above the building drum D can be pressed simultaneously on the entire periphery by the respective pressure-bond rollers 25 from one side end portion to other side end portion to be pressure-bonded by the predetermined press force.

That is, by relatively moving the building drum D to the pressure-bond rollers 25 arranged in the circular shape in the axial direction, as shown by FIG. 8, the carcass ply sheet 16 is pressed by the pressure-bond rollers 25 simultaneously over the entire periphery to be pressure-bonded to the rubber laminating member 10. Particularly, as shown by the drawings, by arranging the two rows of respective pressure-bond rollers 25 in the peripheral direction by shifting the positions in the peripheral direction by the half pitch such that the respective pressure-bond rollers 25 are not spaced apart from each other in the peripheral direction as a whole at least in the progressive displacement state (press state) to the inner side in the diameter direction, the entire periphery of the carcass ply sheet can efficiently be pressure-bonded in one motion by the one time motion.

Therefore, the carcass ply sheet can be pressure-bonded firmly along the recessed and projected shape of the rubber laminating member 10 on the inner side and substantially uniformly over the entire width, air can be exhausted firmly without exerting an excessively large press force, and therefore, a partial deficiency in pressure-bond or the like is not brought about, and an excellent adhering state can be achieved.

Further, an excessively large press force may not be exerted to the pressure-bond roller 25, and therefore, the carcass ply sheet 16 is pressure-bonded simultaneously over the entire periphery by moving the pressure-bond rollers 25 in the axial direction, and the carcass ply sheet 16 can be pressure-bonded without bringing about a deformation of slacken-up or the like and also deformation or warp of the carcass cord can be restrained from being brought about.

Further, as the method of pressure-bonding the carcass ply sheet 16, the carcass ply sheet 16 can be pressed to pressure-bond simultaneously over the entire periphery respectively from the center portion in the width direction to the two left and right side ends such that the inscribed circle diameter of the pressure-bond rollers 25 in the circular arrangement of the stitcher apparatus 20 is contracted, first, the building drum D is moved to advance to the vicinity of the center portion in the width direction of the carcass ply sheet 16 to the inner side of the pressure-bond rollers 25 to carry out the press operation, and the respective pressure-bond rollers 25 are made to progressively displaced to the inner side in the diameter direction to carry out the press operation by operating the cylinder apparatus 23 while relatively moving the building drum D to the left and right sides in the axial direction of the pressure-bond rollers 25.

In this case, tension forces in the width direction produced at the carcass ply sheet 16 by relatively moving the building drum D and the pressure-bond roller 25 in the axial direction are operated respectively in directions opposed to each other at left and right portions, and therefore, the pressure-bonding can be carried out without hardly producing deformation or warp to the carcass ply sheet 16, that is, the carcass cord.

The carcass band built by being pressure-bonded in this way is transferred to a later step for tire building, that is, a step of carrying out bead set and a turn up or the like and a green tire is built.

In this way, the carcass ply sheet 16 is pressed in the width direction to be pressure-bonded by the respective pressure-bond rollers 25 simultaneously over the entire periphery by passing the building drum D supported by the moving support base 11 to inside of the pressure-bond rollers 25 in the circular arrangement of the stitcher apparatus 20 of the invention in the axial direction after pasting to laminate the carcass ply sheet 16 on the rubber laminating member 10 of the inner liner or the like on the periphery of the building drum D in the band building step, and therefore, a time period required for pressing, and therefore, a building cycle time period of the carcass band can considerably be shortened. Further, the entire periphery of the carcass ply sheet 16 can be pressed simultaneously and substantially uniformly, and therefore, exhaust of air and the pressure-bonding are improved, thereby, the carcass band of excellent quality can be built. Therefore, the carcass band can contribute to promoting an efficiency of building a tire.

Although in the above-described example, when the building drum D is supported by the moving support base 11, the carcass band is built by setting the building positions different from each other for the respective members constituting the carcass band, there is shown a case in which after pasting the carcass ply sheet 16, the carcass ply sheet 16 is moved to the portion of the stitcher apparatus 20, and the carcass ply sheet 16 is pressure-bonded by moving the building drum D relative to the pressure-bond rollers 25, the invention is not limited thereto but the respective members constituting the carcass band can be successively pasted to build the carcass band at a constant position without moving the building drum D, or the carcass ply sheet 16 can be pressure-bonded similarly by moving the stitcher apparatus 20 relatively in the axial direction without moving the building drum D.

In embodying the invention, it is preferable in view of an operability and a building efficiency to move the building drum D as in the illustrated example.

Industrial Applicability

The invention can be utilized preferably in the step of building the carcass band in the tire building step.

Description of Reference Numerals and Signs

Figure 1:
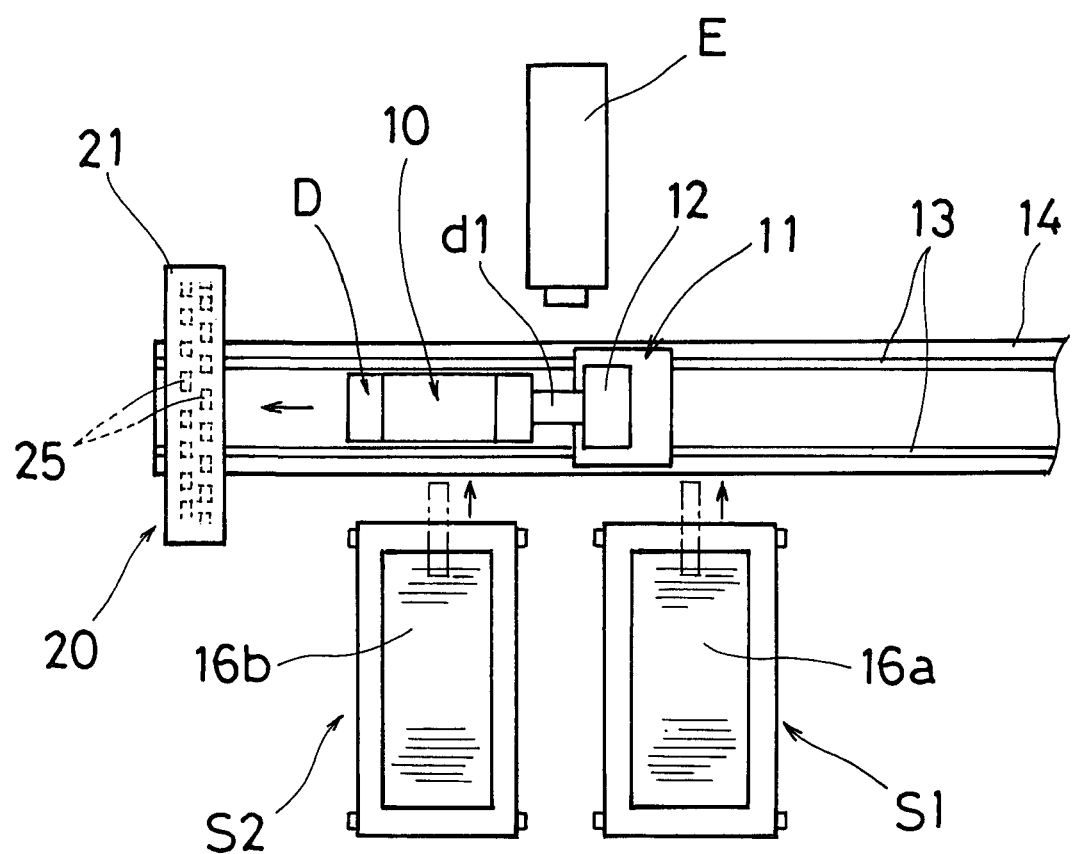
FIG. 1 is an outline plane view showing a portion of a band building step including a stitcher apparatus according to the invention.
Figure 2:
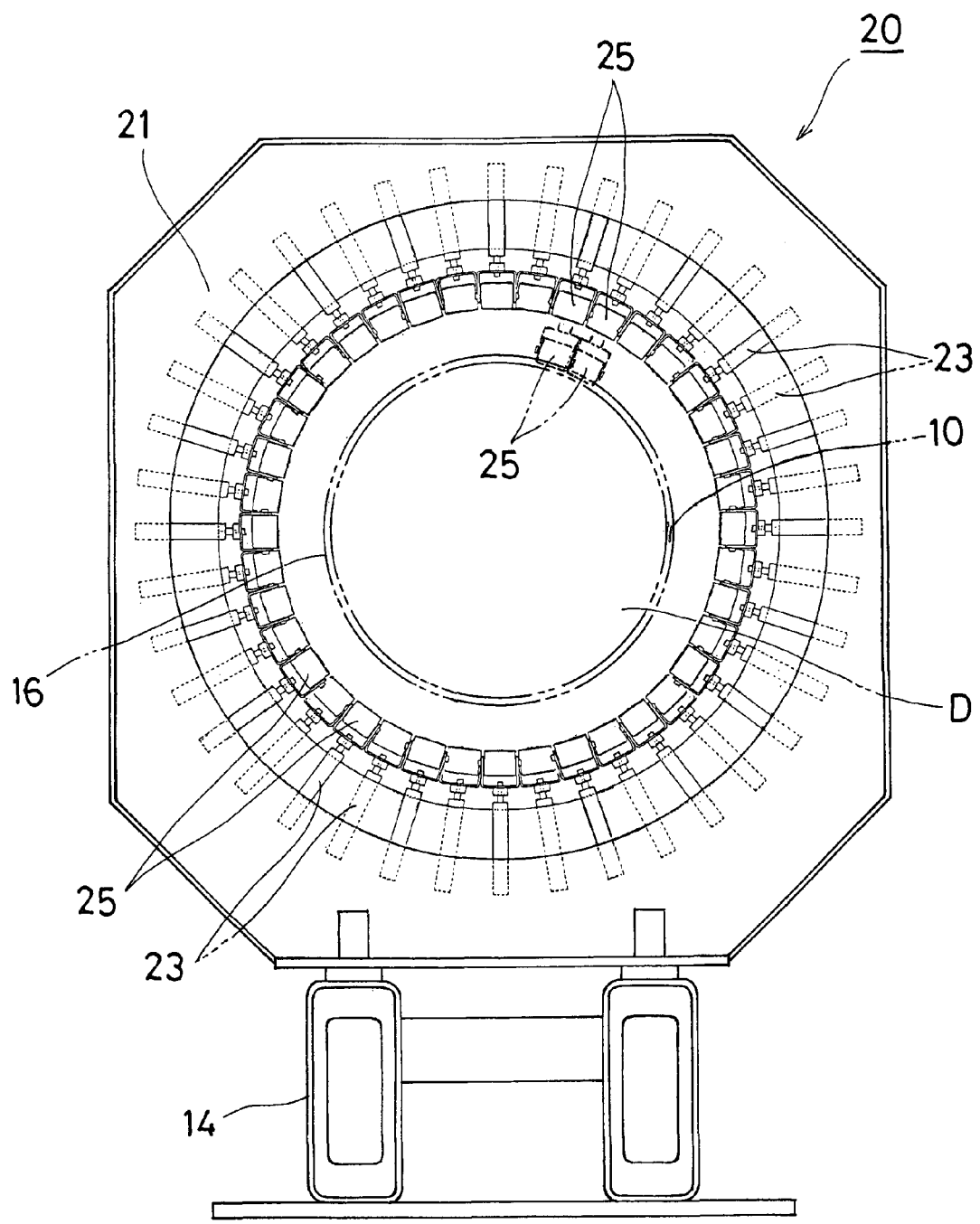
FIG. 2 is a front view of the stitcher apparatus of the example of the invention.
Figure 3:
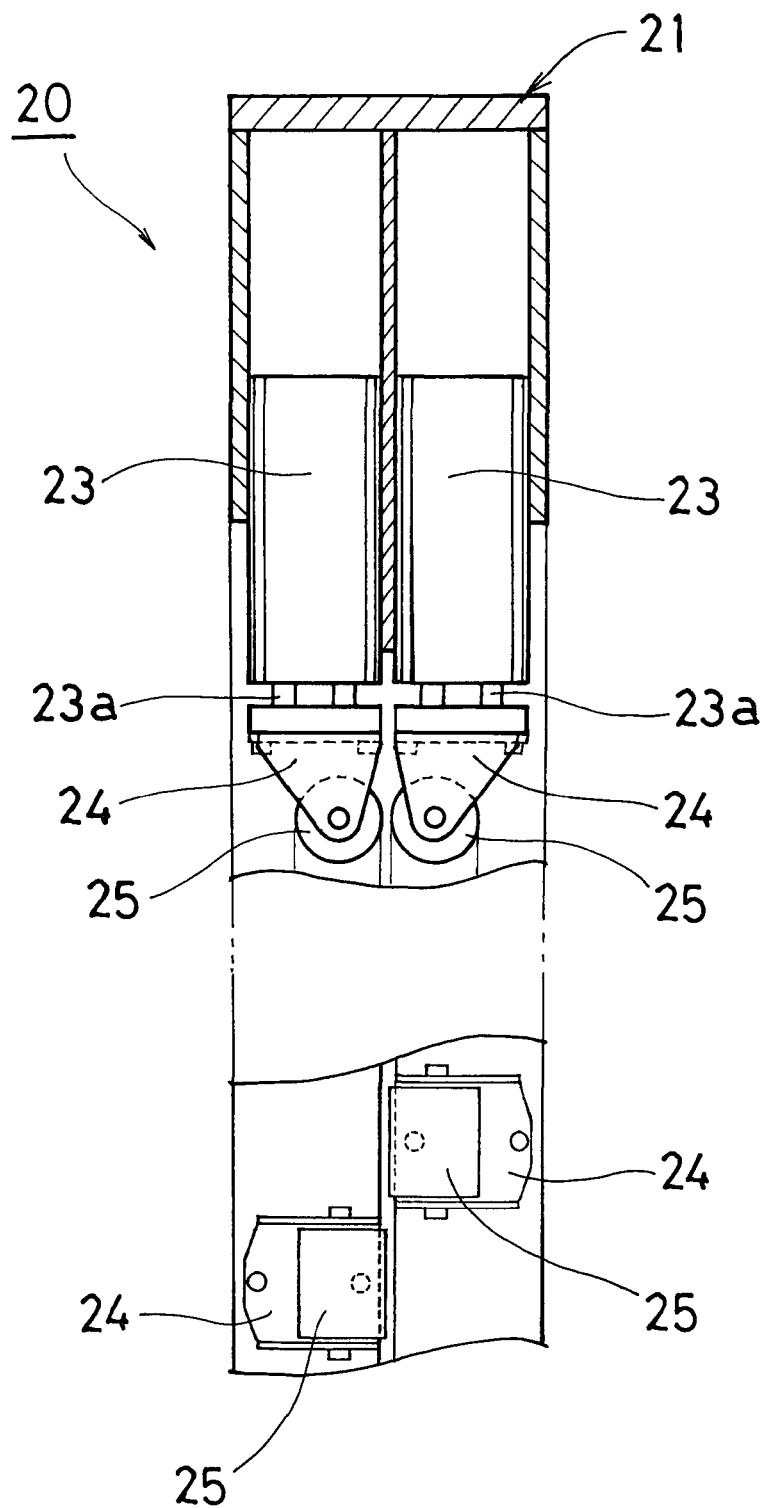
FIG. 3 is an enlarged vertical sectional view of a portion of the stitcher apparatus.
Figure 4:
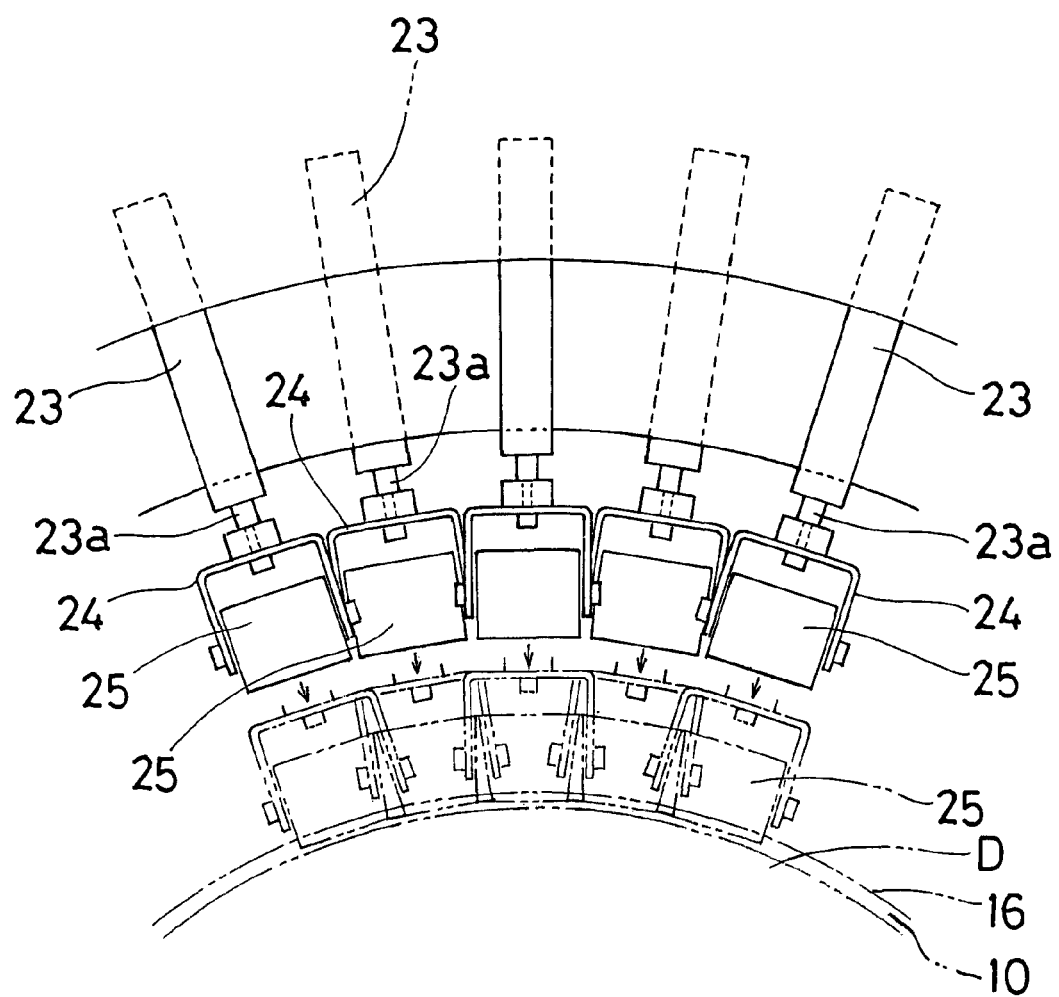
FIG. 4 is an enlarged front view of a portion showing an arrangement of a pressure-bond roller of the stitcher apparatus.
Figure 5:
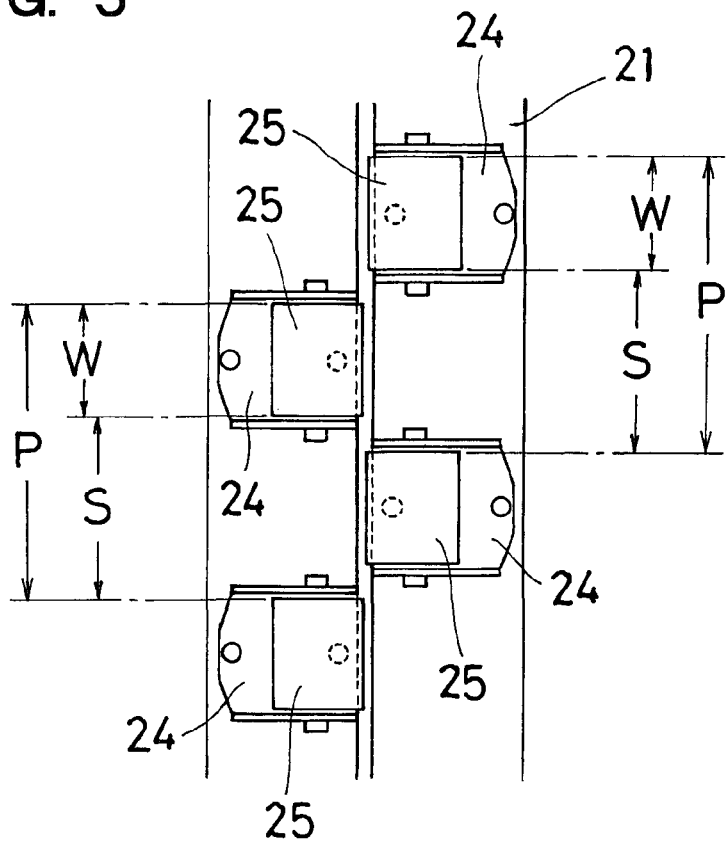
FIG. 5 is an outline development view of a portion for explaining an arrangement of the pressure-bond roller in non progressive displacement.
Figure 6:
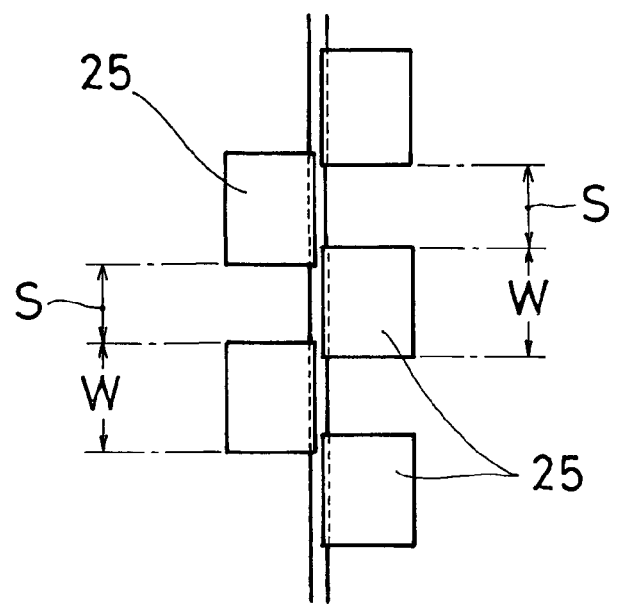
FIG. 6 is an outline development view of a portion for explaining an arrangement of the pressure-bond roller in progressive displacement.
Figure 7:
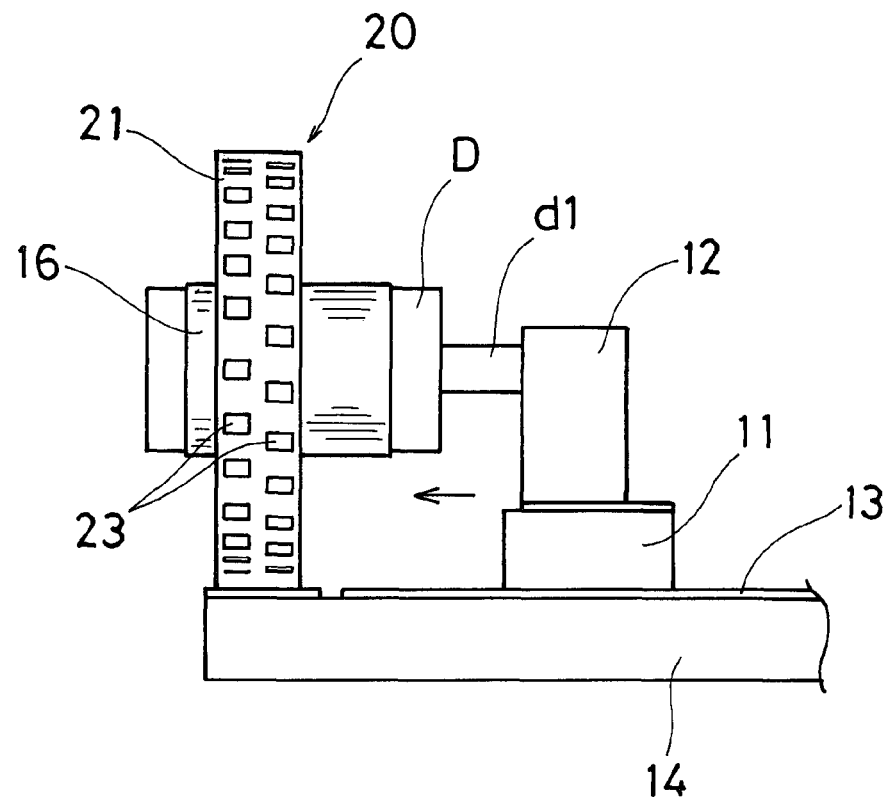
FIG. 7 is an explanatory view in a pressure-bond operational procedure by the pressure-bond roller.
Figure 8:
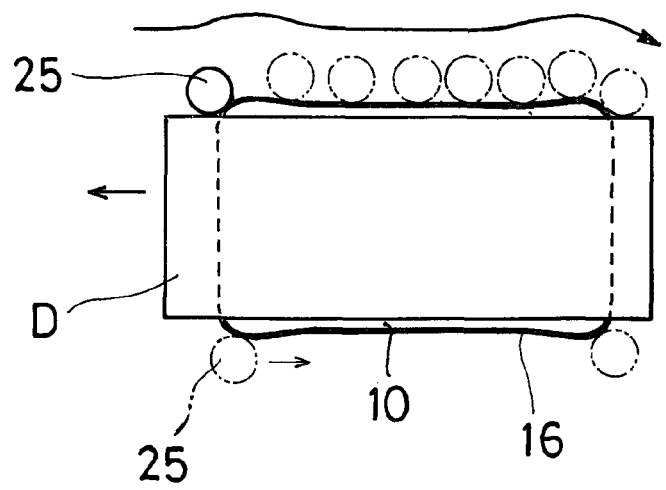
FIG. 8 is an explanatory view of a pressure-bond operational state by the pressure-bond roller.
Figure 9:
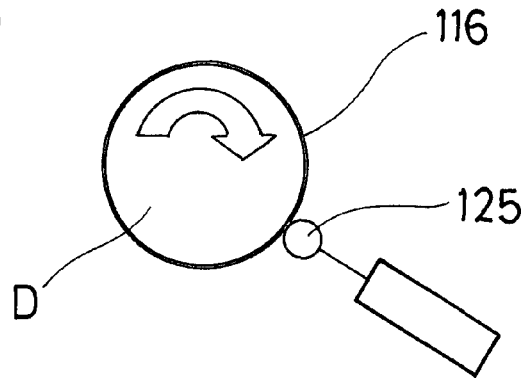
FIG. 9 is an explanatory view in a pressure-bond operational state by a stitcher apparatus of a background art.
Figure 10:
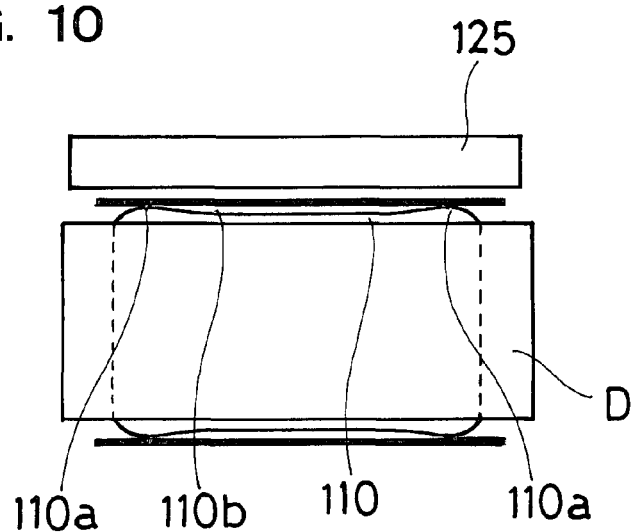
FIG. 10 is an explanatory view of a pressure-bond operational state by a pressure-bond roller of a background art.
Figure 11:
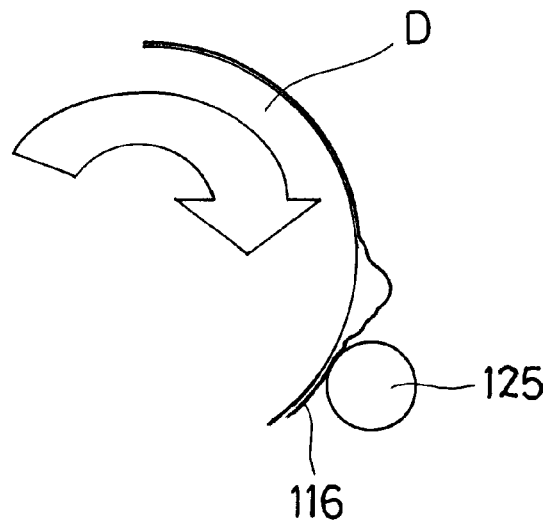
FIG. 11 is an explanatory view of a pressure-bond operational state by a pressure-bond roller of the background art.
Figure 12:
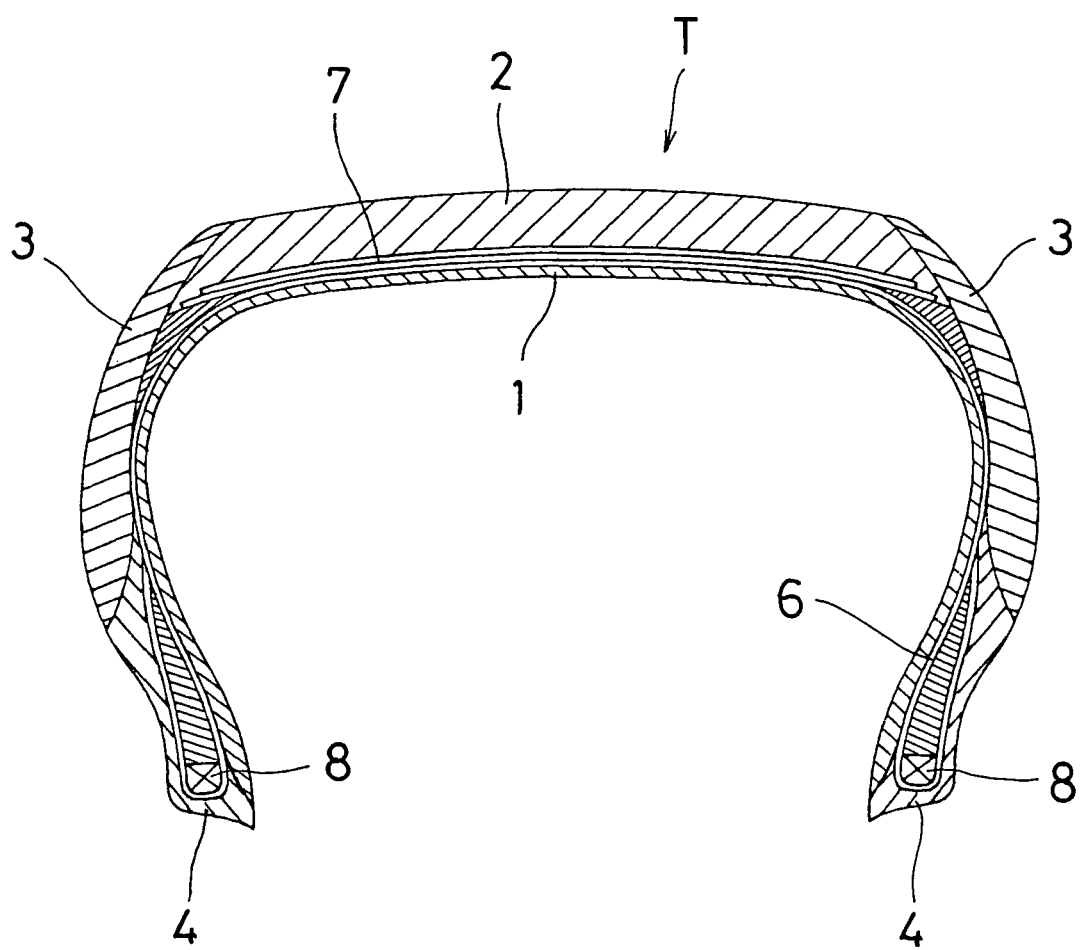
FIG. 12 is an explanatory view of a section of a tire structure.

B . . . inscribed circle diameter, D . . . building drum, d1 . . . shaft portion, E . . . extruder, T . . . tire, S1 . . . servicer of first carcass ply sheet, S2 . . . servicer of second carcass ply sheet, 1 . . . inner liner, 2 . . . tread, 3 . . . side wall, 4 . . . chafer, 5 . . . belt roller pad, 6 . . . carcass layer, 7 . . . belt layer, 8 . . . bead, 10 . . . rubber laminating member, 11 . . . moving support base, 12 . . . drive portion, 13 . . . track, 14 . . . base portion for track, 16, 16a, 16b . . . carcass ply sheets, 20 . . . stitcher apparatus, 21 . . . ring-like frame, 23 . . . cylinder apparatus as extracting and contracting means, 23a . . . output shaft, 24 . . . bracket, 25 . . . pressure-bond roller

The invention claimed is:

1. A method of forming a carcass band for forming a tire, comprising:

pasting a carcass ply sheet onto a rubber sheet member that is wound around a building drum; then, pressing the carcass ply sheet from its outer periphery using a stitcher apparatus comprising a plurality of pressure-bond rollers having elasticity and a cylindrical shape, each of which having a roller axis tangential to a circle line that is concentric to and larger than the building drum, a plurality of supporting mechanisms for advancing and retreating each supporting one of the pressure-bond rollers so as to be movable in diametrical direction, wherein the pressure-bond rollers are arrayed, in a plurality of rows, throughout an entire range of the circle line by a constant pitch in circumferential direction, and the supporting mechanisms comprises a plurality of air cylinders capable of permitting displacement in diametrical direction following recessed and projected shape of a pressed surface, wherein the building drum is placed inside of the circle line, and the building drum is moved in axial direction relative to the pressure-bond rollers inside a circular array of the pressure-bond rollers during the pressing step, and wherein, when the building drum is moved in the axial direction relative to the pressure-bond rollers, the pressure-bond rollers are moved inward in a diameter direction such that the inscribed circle diameter of the pressure-bond rollers in the circular array is made to be smaller than the outer diameter of the carcass ply sheet on the building drum, and whole periphery of the carcass ply sheet is pressed to be bonded simultaneously by the pressure-bond rollers with a preset pressure, wherein the carcass ply sheet is pressed by the pressure-bond rollers to pressure-bond from a center portion in a width direction over to a side end by moving the building drum relative to the pressure-bond rollers of the stitcher apparatus starting from a vicinity of a center portion to the side in the axial direction, wherein the pressure-bond rollers of respective rows are advanced inward in the drum diameter direction, in a state that positions of the pressure-bond rollers are arranged in the drum peripheral direction such that at least portions of the pressure-bond rollers of contiguous rows overlap each other in the drum axial direction, while the pressure-bond rollers are not spaced apart by intervals in the drum peripheral direction as a whole, wherein each of the pressure-bond rollers are axially supported by a bracket provided at a front end portion of an output shaft of the air cylinder, and capable of being independently shifted, and retracting the pressure-bond rollers in a non-pressing operation state, so that an interval between the rollers in the peripheral direction of the drum is larger than a roller width.

2. The method of forming a carcass band in building a tire according to any one of claim 1, wherein the building drum is supported at one end portion of a shaft portion thereof in a cantilever state by a moving support base movable on a track, the carcass ply sheet is pressure-bonded while the building drum is moved inner side of the pressure-bond rollers of the stitcher apparatus by driving the moving support base.

3. The method of forming a carcass band in building a tire according to claim 2, wherein the stitcher apparatus is installed within a reach of movement of the building drum by the moving support base contiguous to a building position of winding the carcass ply sheet, the building drum is moved to the inner side of the pressure-bond rollers of the stitcher apparatus after the carcass ply sheet has been pasted on the building drum, and the building drum is moved relative to the pressure-bond rollers in the axial direction.

* * * * *